United States Patent
Han et al.

(10) Patent No.: US 7,533,315 B2
(45) Date of Patent: May 12, 2009

(54) INTEGRATED CIRCUIT WITH SCAN-BASED DEBUGGING AND DEBUGGING METHOD THEREOF

(75) Inventors: I-Chieh Han, Taipei (TW); You-Ming Chiu, Taipei Hsien (TW)

(73) Assignee: Mediatek Inc., Hsin-Chu (TW)

( * ) Notice: Subject to any disclaimer, the term of this patent is extended or adjusted under 35 U.S.C. 154(b) by 314 days.

(21) Appl. No.: 11/368,754

(22) Filed: Mar. 6, 2006

(65) Prior Publication Data

US 2007/0220391 A1   Sep. 20, 2007

(51) Int. Cl.
    *G01R 31/28* (2006.01)
(52) U.S. Cl. .......................... 714/733; 714/21; 714/25; 714/30; 714/37; 714/723; 714/724; 714/726; 714/727; 714/729; 714/734; 714/741; 703/13; 703/23; 703/28
(58) Field of Classification Search ........................ None
    See application file for complete search history.

(56) References Cited

U.S. PATENT DOCUMENTS

| | | | | |
|---|---|---|---|---|
| 5,253,255 A * | 10/1993 | Carbine | .................. | 714/734 |
| 5,566,303 A * | 10/1996 | Tashiro et al. | .................. | 710/100 |
| 5,590,354 A * | 12/1996 | Klapproth et al. | .................. | 714/30 |
| 5,915,083 A * | 6/1999 | Ponte | .................. | 714/30 |
| 5,995,993 A * | 11/1999 | Liang | .................. | 708/525 |
| 6,389,557 B1 | 5/2002 | Yu et al. | .................. | 714/34 |
| 6,550,031 B1 * | 4/2003 | Godfrey et al. | .................. | 714/726 |
| 6,574,590 B1 * | 6/2003 | Kershaw et al. | .................. | 703/28 |
| 6,594,802 B1 * | 7/2003 | Ricchetti et al. | .................. | 716/4 |
| 6,687,865 B1 * | 2/2004 | Dervisoglu et al. | .................. | 714/726 |
| 6,820,051 B1 | 11/2004 | Swoboda | .................. | 703/28 |
| 6,826,717 B1 | 11/2004 | Draper et al. | .................. | 714/39 |
| 6,941,498 B2 * | 9/2005 | Hartano et al. | .................. | 714/729 |
| 7,080,301 B2 * | 7/2006 | Dervisoglu et al. | .................. | 714/733 |
| 7,216,276 B1 * | 5/2007 | Azimi et al. | .................. | 714/733 |
| 2004/0030958 A1 * | 2/2004 | Moerman | .................. | 714/30 |
| 2004/0054950 A1 * | 3/2004 | Larson et al. | .................. | 714/727 |
| 2004/0210805 A1 * | 10/2004 | Kimelman et al. | .................. | 714/724 |
| 2005/0102574 A1 * | 5/2005 | Larson et al. | .................. | 714/30 |
| 2005/0102575 A1 * | 5/2005 | Larson et al. | .................. | 714/30 |
| 2005/0193251 A1 * | 9/2005 | Chuang et al. | | |
| 2007/0033454 A1 * | 2/2007 | Moss et al. | .................. | 714/724 |

* cited by examiner

*Primary Examiner*—John P Trimmings
(74) *Attorney, Agent, or Firm*—Thomas, Kayden, Horstemeyer & Risley

(57) ABSTRACT

An integrated circuit comprises a test interface, an embedded in-circuit emulator, a circuit-under-debugging, and a memory. The embedded in-circuit emulator is used for software debugging via the test interface. The circuit-under-debugging comprises a scan chain dumping states of every delayed flip-flop (DFF) out of the circuit-under-debugging. The memory stores the states from the scan chain and transfers the states to a computer via the test interface.

30 Claims, 4 Drawing Sheets

INTEGRATED CIRCUIT WITH SCAN-BASED DEBUGGING AND DEBUGGING METHOD THEREOF

BACKGROUND

The invention relates to scan-based debugging and, in particular, to an integrated circuit with scan-based debugging with help of an embedded in-circuit emulator.

Currently, silicon diagnosis methods in integrated circuit technology often used are visual inspection by electron beam probing, direct physical contact with probe needles, and dedicated debug registers to display signal states for debugging. It is also common to share debug ports with normal functional pins under debug mode and use a logic analyzer to determine the status of an internal circuit.

FIG. 1 is a schematic diagram of a conventional debugging method of an integrated circuit disclosed in U.S. Pat. No. 6,687,865. A service processor unit (SPU) 101 is incorporated in an integrated circuit 100 and coupled to a system bus 105 and an added test bus 104. Test wrappers 102 are connected to the test bus 104 to provide test communication channels into selected blocks 106. The SPU 101 provides a connection for an external diagnostic console 103 to view and test the internal workings of the integrated circuit 100.

Required instructions are stored in a system SRAM. The SPU 101 follows the instructions in the system SRAM and transfers test patterns stored in the system SRAM to a certain portion of user defined logic. Thereafter, test results are serially transferred from the logic and analyzed by the SPU 101. In other words, the PSU 101 provides a specific pattern to a specified logic and analyze outcome thereof, similar to ATPG. All operations of the SPU 101 are performed with scan chains in the integrated circuit 100.

U.S. Pat. No. 6,687,865 also discloses a built-in logic analyzer utilized to capture internal signal states and the captured data are stored in the system SRAM. The captured data can be accessed by a diagnostic console 103 via existing test ports.

The SPU provides test patterns and analyzes the test results. The SPU, however, deals only with a specified portion of user-defined logic. In addition, data accessed by the diagnostic console via the test interface is probed by the built-in logic analyzer.

SUMMARY

An embodiment of an integrated circuit with scan-based debugging comprises a test interface, an embedded in-circuit emulator, a circuit-under-debugging, and a memory. The embedded in-circuit emulator is used for software debugging via the test interface. The circuit-under-debugging comprises a scan chain dumping states of every scanned delayed flip-flop (DFF) out of the circuit-under-debugging. The memory stores the states from the scan chain and transfers the states to a computer via the test interface.

An embodiment of a scan-based debugging method of an integrated circuit comprises freezing operation of the integrated circuit at a normal function mode, dumping states of a plurality of nodes out of the circuit-under-debugging with a scan chain, storing the states of the nodes in a memory, and transferring the states of the nodes to a computer via a test interface.

States of internal flip-flops, whether in the same or different clock domains, or whether in the same or different voltage domains, in an integrated circuit according to an embodiment of the invention can be accessed by an external computer via an embedded in-circuit emulator (ICE). Hardware, such as existing scan chains, test interface, or on-chip memory, is re-used to dump states of the flip-flops out of the integrated circuit such that there is minimal timing or area impact on the original design. In addition, pre-processing of the dumped data by software and a user interface on the computer increases debugging convenience.

DETAILED DESCRIPTION

Figure 1:
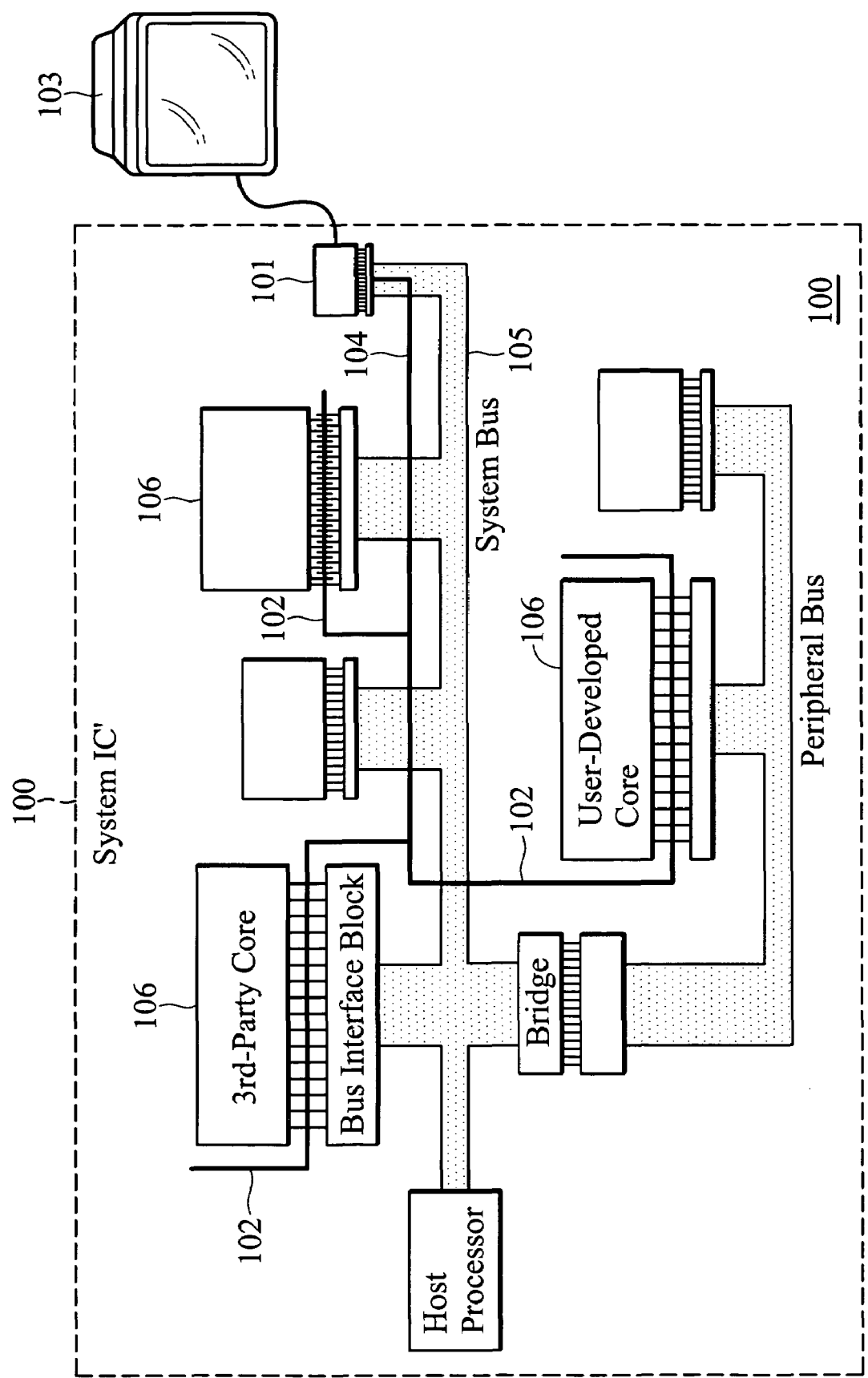
FIG. 1 is a schematic diagram of a conventional debugging method of an integrated circuit disclosed in U.S. Pat. No. 6,687,865.
Figure 2:
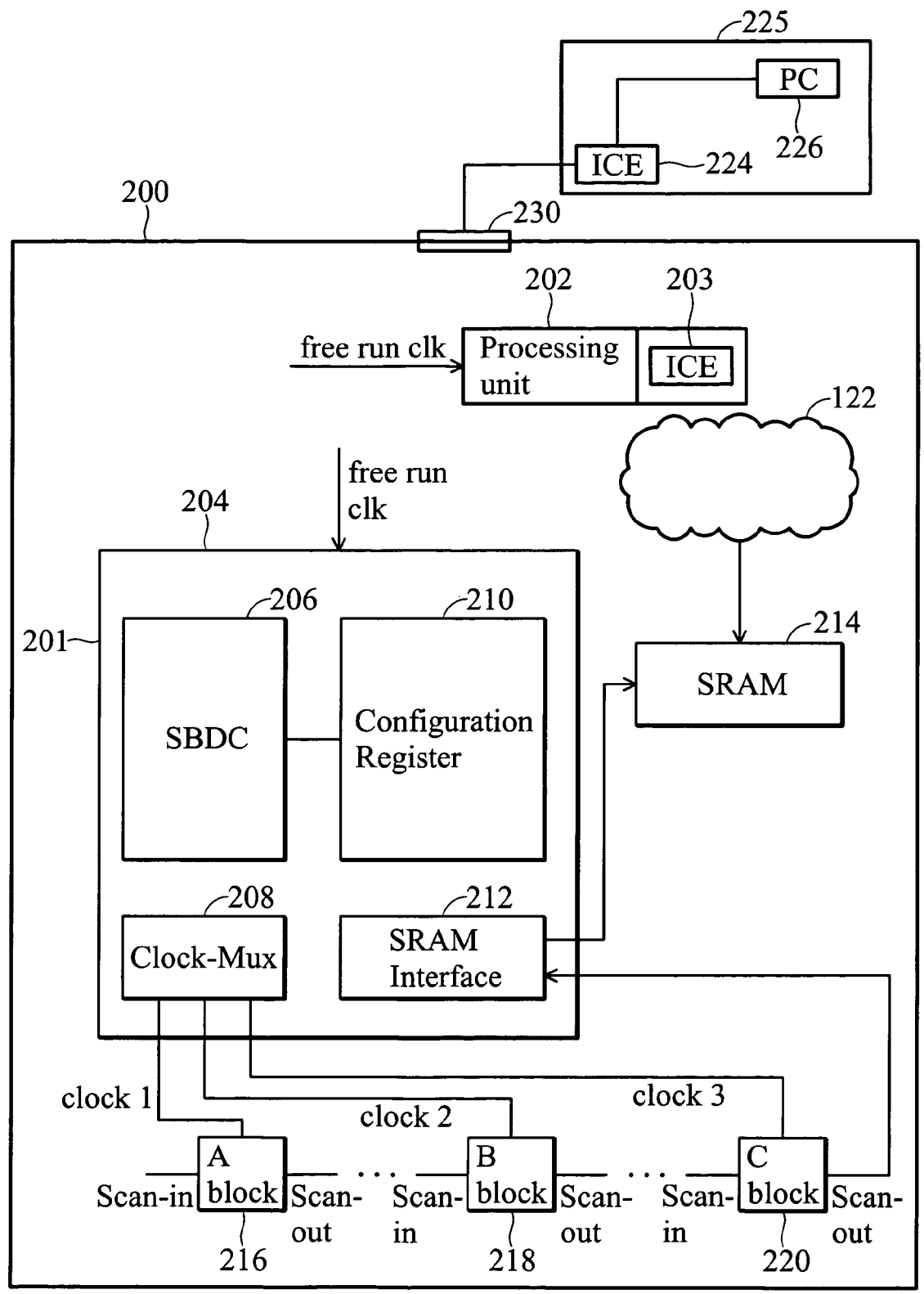
FIG. 2 is a schematic diagram of an integrated circuit with a scan-based device according to an embodiment of the invention.

FIG. 2 is a schematic diagram of an integrated circuit with an in-circuit emulator (ICE) according to an embodiment of the invention. The integrated circuit 200 comprises a test interface 230, an embedded in-circuit emulator 203, a circuit-under-debugging (CUB) 216~220, and a memory 214. In another embodiment, the memory can be an external memory (outside the integrated circuit 200). The embedded in-circuit emulator 203 is used for software debugging via the test interface 230. The circuit-under-debugging 216~220 comprises a scan chain dumping the states of every flip-flop out of the circuit-under-debugging 216~220. The memory 214 stores the states from the scan chain and transfers the states to a computer 226 via the test interface 230. The test interface 230 is, for example, a JTAG interface or an RS 232 interface.

The integrated circuit 200 in the embodiment can further comprise a scan-based debugging (SBD) device 201 coupled to the circuit-under-debugging (CUB) 216~220 and the memory 214. The scan-based debugging (SBD) device 201 comprises a SBD controller (SBDC) 206.

When a predetermined condition is met, the scan-based debugging controller 206 enters a scan mode (that is, a debugging mode or an ICE mode). The predetermined condition can be hardware triggered or software triggered. That is, the scan mode can be initiated by hardware (such as SBDC 206) or by a command from an outside device (such as the personal computer 226).

In one embodiment (a hardware triggered case), the predetermined condition is, for example, the time when an error signal is sent from the circuit-under-debugging (216, 218, 220). Any possible error condition can be programmed into the scan-based debugging controller 206. When SBDC 206 is activated, SBDC 206 can check whether the predetermined error conditions are met. Once a predetermined condition is met, SBDC 206 freezes the circuit-under-debugging (216, 218, 220) and enters a scan mode.

In another embodiment (a software triggered case), designers can directly command the SBDC 206 to enter a scan mode from an outside device (out of the integrated circuit 200). The outside device is a host controller 225, such as a personal computer 226 and an ICE (in circuit emulator) 224. The. PC 226 can coordinate with the ICE 224 to communicate with the integrated circuit 200. In another embodiment, the host controller 225 can be an analyzer.

Moreover, the SBD device 201 can further comprise configuration registers 210. The configuration registers 210 are configured from a processing unit 202 (such as a CPU, central processing unit, or a DSP, digital signal processor) and the SBDC 206 performs the state machine operation according to the configuration settings. In addition, the SBD device 201 comprises a clock generator 208. The clock generator 208 provides a clock to the circuit-under debugging 216~220 according to a mode (normal mode or scan mode) thereof. In a normal mode, a normal clock is provided, while in a scan mode, a scan clock is provided. In one embodiment, clock 1, clock 2, and clock 3 can have different clock frequencies. That is, A, B, and C blocks can run under different clock domains. Furthermore, the SBD device 201 comprises a memory interface 212 coupled between the memory 214 and the scan chain. The input scan_in and output scan_out of each circuit-under-debugging (CUB) 216~220 imply the scan chain. The memory 214 is, for example, a SRAM and the memory interface 212 is, for example, a SRAM interface.

In the embodiment, if a specific condition is met, an interrupt is sent to the processing unit 202 and the processing unit 202 switches to an ICE mode (debugging mode). Meanwhile, the interrupt signal is also sent to SBD device 204 such that the SBD device 204 freezes the circuit-under debugging 216~220, i.e., stops all clocks (the clock 1, clock 2, and clock 3) to the circuit blocks 216~220. The circuit blocks 216~220 originally run, for example, at three different clock rates (clock 1, clock 2, and clock 3) or at different voltage domains. The processing unit 202 triggers the SBDC 206 to perform a state machine operation. Then, the SBDC 206 switches the circuit blocks 216~220 to a scan mode. In the scan mode, scan_out of a circuit block 216, for example, is connected to scan_in of a next circuit block 218, and the clocks 1,2,3 are changed. For example, upon the ICE mode starting, the processing unit 202 writes configuration settings into the configuration register 210, and the SBDC 206 is triggered by the configuration settings stored in the configuration registers 210 and performs a state machine operation. It is noted that programming of registers is just one way to trigger preparation of the memory interface 212 to receive the data from the output scan-out of the last circuit block 220 and write the received data to the memory 214. The clock generator 208 selects and outputs a scan clock rate to the A, B, and C blocks. Then, all of the circuit blocks 216~220 operate at the selected clock rate and the scan_in and scan_out of each block are connected to serially shift the states of sequential elements out. Sequential elements are, for example, flip flops or latches. For description convenience, flip flops are used as examples in the following embodiments. There can be single or multiple scan chains sending data of flip flops to the memory interface 212, depending on the situation. The data of flip flops shifted out is then received by the memory interface (or a memory controller) 212. The memory interface 212 then writes the data shifted out into the memory 214. Thereafter, the computer 226, via the ICE 224 and the embedded ICE 203, can access all data stored in the memory 214. Subsequently, data analysis can be performed by the ICE 224 and the embedded ICE 203 for debugging.

In another embodiment, the host controller 225 does not perform a post-processing on the digital data from the memory 214. The digital data is transferred to another device (such as another personal computer) for post-processing. Therefore, the digital data is finally processed and diagnosed by the device, rather than by the host controller 225.

Designers can monitor states of flip flops during several continuous or discontinuous clock cycles by the aforementioned method. For example, at clock cycle N of the clock 1 domain, block A, B, and C are frozen and states of flip flops are shifted out. Then, the same process runs all over again, but this time block A, B, and C are frozen at clock cycle N+1 and the states are shifted out. Similarly, block A, B, and C can be frozen again at clock cycle N+2 to shift out the states. Thus, designers can get states of the flip flops during 3 continuous clock cycles. By proper programming, designers can monitor states of all necessary flip flops at any clock cycle.

Figure 3:
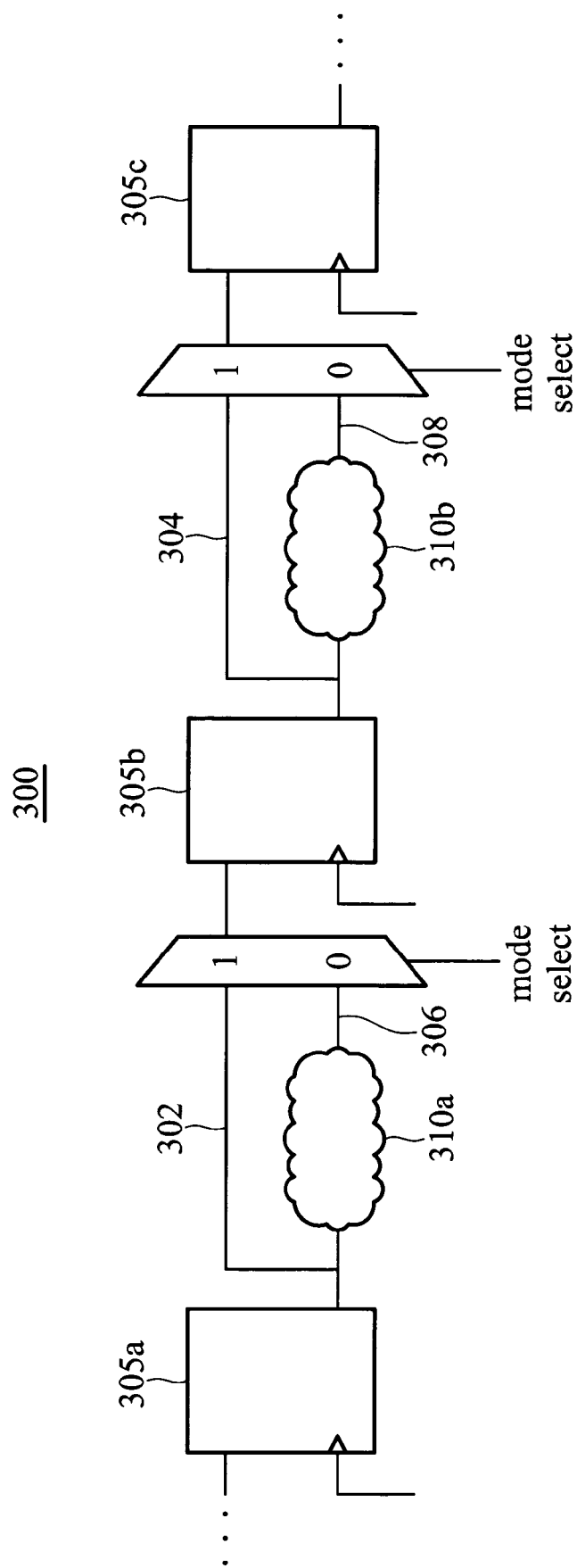
FIG. 3 is a schematic diagram of a scan chain in the scan-based device in FIG. 2.

In this embodiment, as shown in FIG. 3, in a normal function mode, the circuit 300 operates normally through the paths 306 and 308. In a debugging mode (or scan mode), the digital data (1 or 0) kept at the output of each flip flop 305a~305c is transferred through paths 302 and 304. The digital data of each flip flop is serially shifted out of the circuit 300. Then the digital data is input into a memory, such as an SRAM. The digital data stored in the built-in memory is then transferred via a test interface, such as a JTAG interface, to an ICE for debugging or analysis. An appropriate space matching the amount of digital data can be allocated in the built-in memory. In one embodiment, a very small space, one or two bytes for example, can be allocated to store the digital data. In another embodiment, a space that can store data from all necessary flip flops of the integrated circuit can be allocated.

Figure 4:
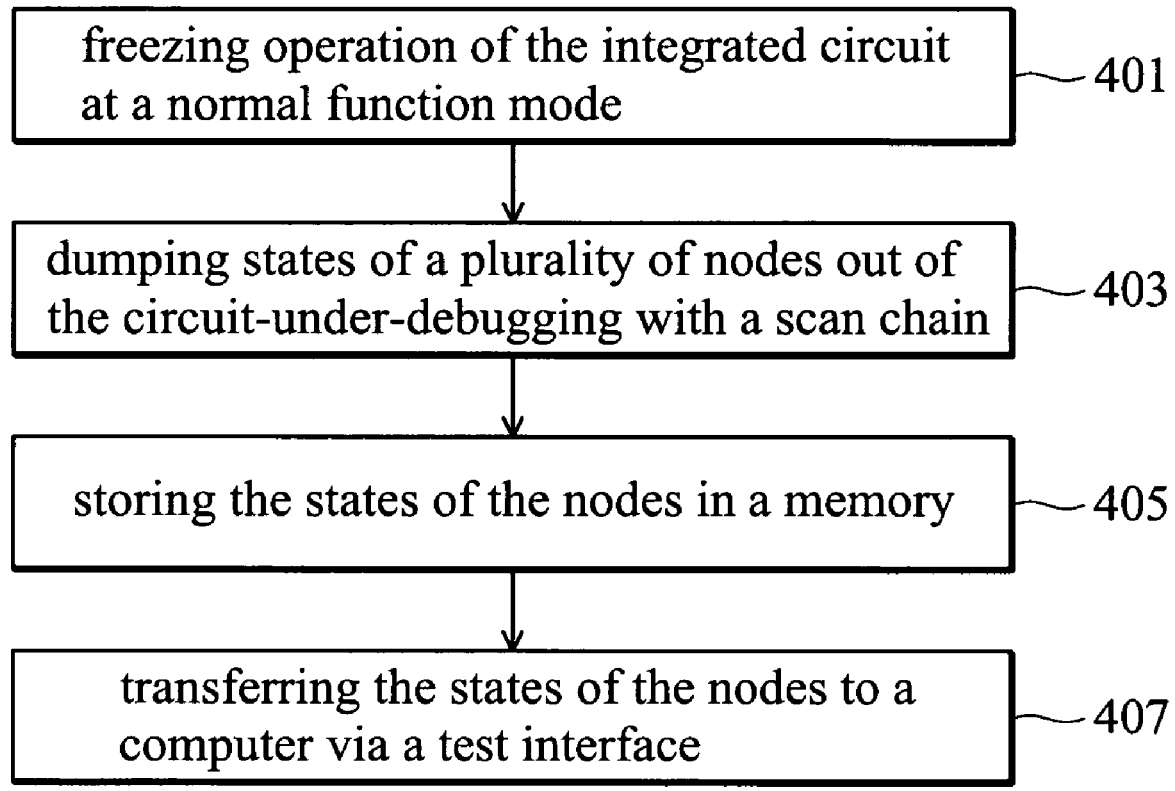
FIG. 4 illustrates an embodiment of a scan-based debugging method of an integrated circuit.

FIG. 4 illustrates an embodiment of a scan-based debugging method of an integrated circuit. The method comprises freezing operation of the integrated circuit at a normal function mode (401), dumping states of a plurality of nodes out of the circuit-under-debugging with a scan chain (403), storing the states of the nodes in a memory (405), and transferring the states of the nodes to a computer via a test interface (407). The test interface is, for example, a JTAG interface. The memory is a SRAM and the memory interface is a SRAM interface.

More specifically, before dumped out of the circuit-under-debugging, the states of nodes are captured by flip-flops. In addition, upon freezing of the integrated circuit, the circuit operation is frozen according to a state machine operation of a scan-base debugging controller. Moreover, upon freezing of the integrated circuit, state machine operation of the scan-base debugging controller is performed according to configuration settings in configuration registers.

States of internal flip-flops, whether in the same or different clock domains, in an integrated circuit according to an embodiment of the invention can be accessed by an external computer via an embedded in-circuit emulator (ICE). Hardware, such as existing scan chains, scan sequential cells, test interface, or on-chip memory, are re-used to dump states of the flip-flops out of the integrated circuit such that there is minimum timing or area impact on the original design. In addition, a pre-processing of the dumped data by software and a user interface on the computer increases debugging convenience.

While the invention has been described by way of example and in terms of preferred embodiment, it is to be understood that the invention is not limited thereto. To the contrary, it is intended to cover various modifications and would be apparent to those skilled in the art. Therefore, the scope of the appended claims should be accorded the broadest interpretation so as to encompass all such modifications.

What is claimed is:

1. A debugging system, comprising:
   a test interface;
   a circuit-under-debugging, comprising a scan chain and a plurality of sequential elements, the scan chain capable of shifting states of each of the sequential elements out of the circuit-under debugging;
   a memory for receiving and storing the states;
   a processing unit for receiving an interrupt when a predetermined condition is met;

a scan-based debugging device coupled between the circuit-under-debugging, the processing unit and the memory for performing a scan operation on the circuit-under-debugging upon the interrupt from the processing unit; and an embedded in-circuit emulator for dumping the states out of the debugging system via the test interface according to the scan operation, wherein the circuit-under-debugging and the embedded in-circuit emulator are in an integrated circuit, wherein states of each of the sequential elements are shifted according to the scan operation.

2. The debugging system of claim 1, wherein the scan-based debugging device comprises a scan-based debugging controller, and when the predetermined condition is met, the scan-based debugging controller enters a scan mode.

3. The debugging system of claim 2, wherein the scan-based debugging controller is triggered to enter the scan mode by a signal from a host controller, the host controller being outside the integrated circuit.

4. The debugging system of claim 3, wherein the host controller is a personal computer.

5. The debugging system of claim 2, wherein the scan-based debugging controller is triggered to enter the scan mode when meeting the predetermined condition programmed in the SBD controller.

6. The debugging system of claim 1, wherein the scan-based debugging device comprises a clock generator which provides a clock to the circuit-under debugging according to a mode theref.

7. The debugging system of claim 6, wherein at a normal mode, the clock is a normal clock.

8. The debugging system of claim 6, wherein at a scan mode, the clock is a scan clock.

9. The debugging system of claim 6, wherein the clock generator is capable of freezing the circuit-under-debugging by suspending at least one normal clock at a normal mode.

10. The debugging system of claim 1, wherein the scan-based debugging device comprises a memory interface coupled between the memory and the scan chain.

11. The debugging system of claim 1, wherein the test interface is a JTAG interface.

12. The debugging system of claim 1, wherein the test interface is an RS232 interface.

13. The debugging system of claim 1, wherein the memory is a SRAM.

14. The debugging system of claim 1, wherein the sequential elements are flip flops.

15. The debugging system of claim 1, wherein the sequential elements are latches.

16. The debugging system of claim 1, wherein the memory is in the integrated circuit.

17. The debugging system of claim 1, wherein the memory is out of the integrated circuit.

18. A scan-based debugging method of an integrated circuit, comprising:

freezing operation of the integrated circuit at a normal function mode according to an interrupt when a predetermined condition is met;

performing a scan operation on a circuit-under-debugging upon the interrupt;

shifting states of a plurality of nodes out of the circuit-under-debugging with a scan chain according to the scan operation, wherein the circuit-under-debugging is in the integrated circuit;

storing the states of the nodes in a memory; and transferring the states of the nodes to a host controller via a test interface by an embedded in-circuit emulator, wherein the embedded in-circuit emulator is in the integrated circuit.

19. The scan-based debugging method of an integrated circuit of claim 18, wherein before being shifted out of the circuit-under-debugging, the states of the nodes are captured by sequential elements.

20. The scan-based debugging method of an integrated circuit of claim 19, wherein the sequential elements are flip flops.

21. The scan-based debugging method of an integrated circuit of claim 19, wherein the sequential elements are latches.

22. The scan-based debugging method of an integrated circuit of claim 18, further comprising:

when the predetermined condition is met, having a scan-base debugging controller in the integrated circuit enter a scan mode.

23. The scan-based debugging method of an integrated circuit of claim 22, wherein the step of entering the scan mode is triggered by a signal from a host controller, the host controller being outside the integrated circuit.

24. The scan-based debugging method of an integrated circuit of claim 22, wherein the step of entering the scan mode is triggered by meeting the predetermined condition programmed in the scan-base debugging controller.

25. The scan-based debugging method of an integrated circuit of claim 24, wherein the predetermined condition corresponds to an error condition of the circuit-under-debugging.

26. The scan-based debugging method of an integrated circuit of claim 18, wherein the test interface is a JTAG interface.

27. The scan-based debugging method of an integrated circuit of claim 18, wherein the test interface is an RS 232 interface.

28. The scan-based debugging method of an integrated circuit of claim 18, wherein the memory is a SRAM.

29. The scan-based debugging method of an integrated circuit of claim 18, wherein the memory is in the integrated circuit.

30. The scan-based debugging method of an integrated circuit of claim 18, wherein the memory is out of the integrated circuit.

* * * * *